United States Patent Office 2,899,282
Patented Aug. 11, 1959

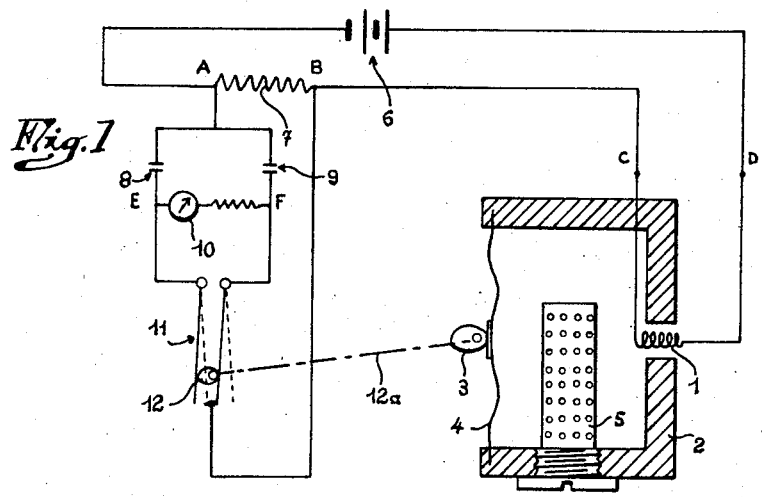
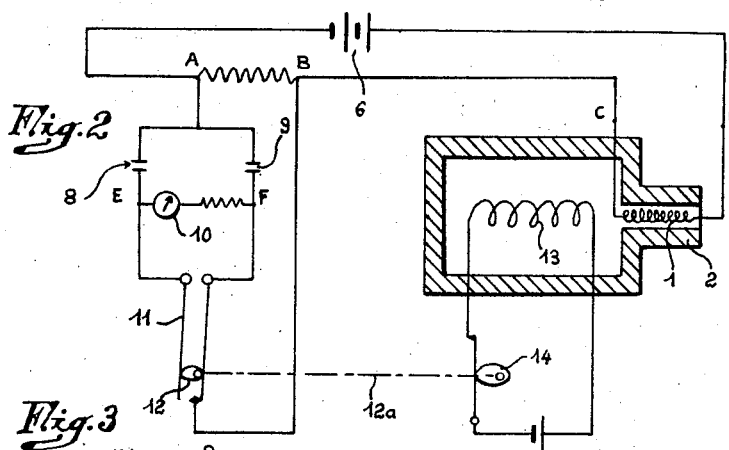
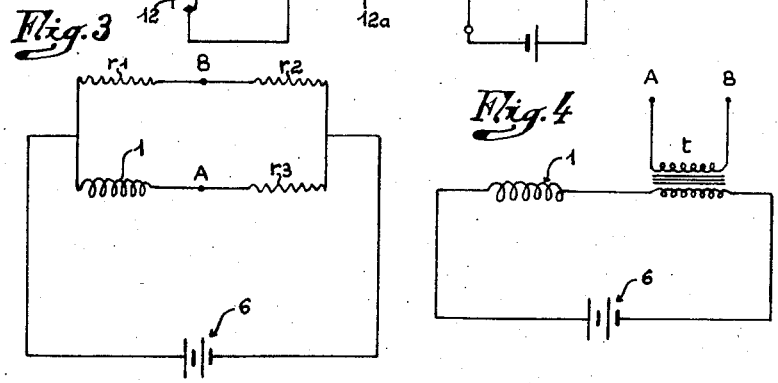
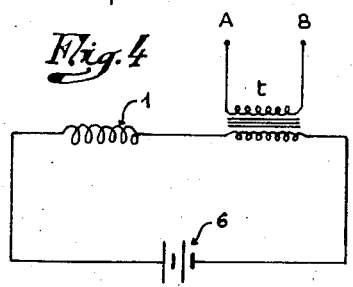

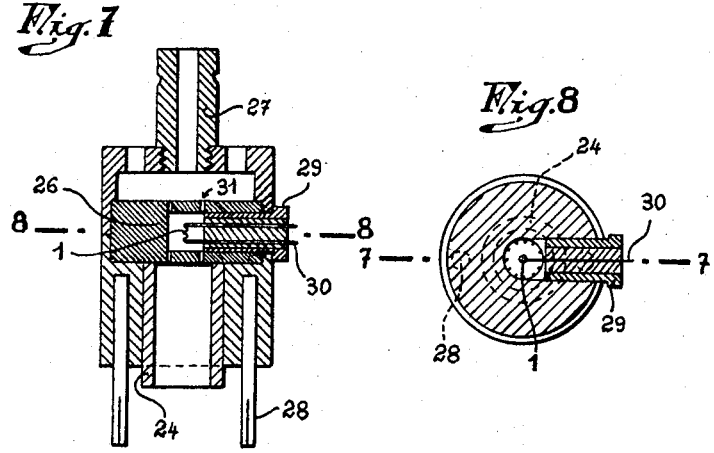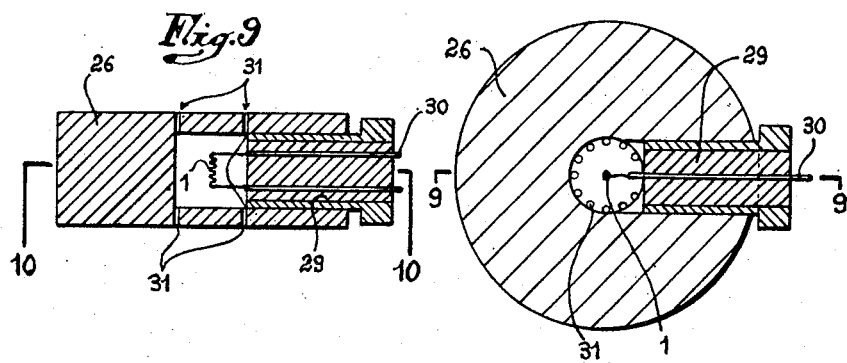

2,899,282

MEANS FOR MEASURING THE CONTENTS OF A COMBUSTIBLE COMPONENT IN A GASIFORM MIXTURE

Charles Eyraud, Lyon, France

Application November 2, 1955, Serial No. 544,570

Claims priority, application France November 19, 1954

7 Claims. (Cl. 23—255)

The measuring of the contents of a combustible component in a gasiform mixture through its catalytic combustion on a platinum filament at a high temperature has been performed hitherto in numerous manners. The chief interest of this method consists in producing a small bulk apparatus which allows an easy measuring.

The principle of almost all measuring instruments designed for the execution of this method is as follows: the mixture to be analyzed which is generally constituted by a combustible gas and by air is fed into a chamber provided with a platinum filament brought through the passage of an electric current to a sufficiently high temperature for the catalytic combustion to be possible. This filament forms one of the four arms of a Wheatstone bridge. The modification in resistance due to the rise in the temperature to which the filament is subjected as a consequence of the cumbustion is thus detected with a very high sensitivity. The milliammeter measuring the amount of the lack of equilibrium in the Wheatstone bridge carries a scale of percentages of combustible gas.

Unfortunately, this method which consists in obtaining the value of the modification in temperature of a filament through a differential measuring of electric resistances in a Wheatstone bridge leads to serious drawbacks. The equilibrium of the bridge changes with time under the combined action of evaporation, thermic deformation, crystalline transformation and deformation through shocks of the platinum filament subjected to severe thermic, chemical and mechanical treatments. Technically this may be stated by mentioning that the zero of the measuring instrument is shifted.

Generally speaking, it may be stated that in all the differential methods proposed hitherto and whatever may be the manner of detecting the heat evolved through the combustion in contact with the catalytic surface resorted to, such as a modification in resistance measured through the bridge, a modification in the luminous intensity of a beam measured through a photocell, a modification in temperature of the catalyst measured through a differential thermocouple, etc., the possibility of a divergent physical transformation of the catalyst on the one hand and of a reference body on the other hand, always limits the faithfulness of the measures obtained through such a shifting of the zero.

To remove this drawback, there are provided in certain instruments means for equilibrating the bridge prior to each measure. Such a contrivance which does not exaggerately complicate portable instruments is not practicable in the case of continuously measuring instruments operating in an unvarying location.

Now, my invention has for its object to substitute for the differential measures executed on two spatially distinct masses as performed at the present time in the measuring instruments operating through catalytic combustion, differential measures executed at intervals spaced in time on a single mass, the successive alternating measures being executed at a frequency such that the instrument may produce a continuous indication. Under certain conditions of frequency, the slow physical modifications of the catalytic mass have no longer any influence on the stability of the zero.

My invention covers furthermore a number of arrangements for the execution of the above disclosed method and also the use of a single filament of catalytically active platinum serving for the differential measure at two successive moments of the phenomenon, the filament being alternatingly subjected to the action of the combustion gases and as a reference mass while the measuring instruments provides however a continuous indication of the contents of combustible gas.

Accompanying drawings illustrate by way of example various embodiments of the method and means according to my invention. In said drawings:

Fig. 1 illustrates diagrammatically a first embodiment.

Fig. 2 illustrates a modification thereof.

Fig. 3 is a wiring diagram including a bridge connection.

Fig. 4 is a wiring diagram including a transformer connection.

Fig. 7 is an axial cross-section through line 7—7 of Fig. 8 of the system including the combustion chamber and the pump body of my improved apparatus.

Fig. 8 is a cross-section through line 8—8 of Fig. 7.

Fig. 9 illustrates on a larger scale and in axial sectional view through line 9—9 of Fig. 10 a detail of a removable fitting for the spiral filament.

Fig. 10 is a cross-section through line 10—10 of Fig. 9.

Figure 5:
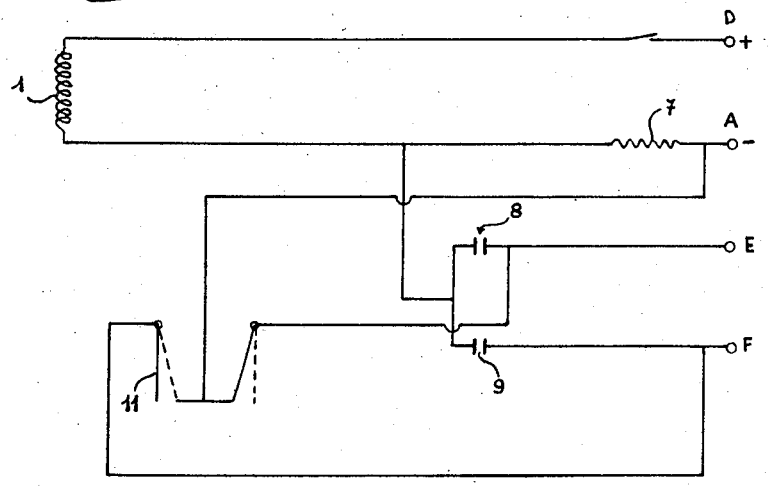
Fig. 5 is a complete wiring diagram for my improved arrangement.

In the case of Fig. 1, the platinum filament is to be subjected alternatingly first to the flow of a mixture containing a combustible gas on the outside of the chamber 2 and then to the flow of the completely or partly burnt gases contained in said chamber. The alternating flow of the gases in both directions is obtained through the operation of the eccentric cam 3 engaging an elastic diaphragm 4 constituted for instance by a pleated metal wall. In order to prevent the steam produced by combustion from condensing on the inner walls of the combustion chamber, I insert inside said chamber a cartridge 5 filled with an absorbent such as silica gel or active alumina, or else I see that the temperature at any point of the chamber wall does not sink underneath the dew temperature of the steam produced by the combustion.

The temperature of the platinum wire 1 fed through the electric cell or battery 8 varies consequently in time between a maximum value (during combustion period), and a minimum value (the filament lying in the combustion gases). The resistance of the filament and consequently the intensity of the electric current flowing through it varies thus periodically. This alternating variation is a function of the contents of combustible gas in the mixture to be analysed flowing on the outside of the chamber 2.

In order to continuously measure these modifications in resistance or intensity I may insert a resistance 7 of a constant value in the filament heating circuit. Across the points A and B of the resistance or across the points C and D of the filament, there appears an alternating current component which is superimposed over the direct current drop in voltage produced by the passage of the electric heating current.

The simplest method for measuring this alternating current component consists in loading a condenser 8 at the moment of the minimum voltage across the points A and B and then another identical condenser 9 at the moment of the following maximum voltage. The difference between the loads of the two condensers is then measured between the points E and F by a galvanometer 10 in series with a large resistance or else by a recording potentiometer. These instruments are provided with a scale giving out directly the percentage of combustible gases. The loading of the condensers 8 and 9 is performed at predetermined moments through the operation of the distributor 11 which includes two contact blades controlled by a cam 12 keyed to the same shaft 12a as the cam 3 distributing the gasiform stream onto the filament 1.

The precedingly disclosed embodiment is given merely by way of example, and by no means in a binding sense. As a matter of fact, numerous modifications may be contemplated.

As far as the electric circuit is concerned, other arrangements may allow measuring the alternating variations of the resistance of the platinum filament. For instance, the bridge connection, illustrated in Fig. 3, constituted by the filament 1 and the three resistances r1, r2, r3, provides for the production across the points A and B of an alternating voltage, excluding completely, or at least nearly so, a direct current component, the value of said alternating voltage providing a measure of the contents of combustible gas in the mixture to be analyzed.

It is also possible to make the alternating voltage component appear without any D.C. component through a transformer the primary of which is inserted in series with the filament 1, as illustrated in Fig. 4.

It is again possible to measure the difference in voltage across the points A and B of Figs. 1, 2, 3 and 4, after amplification, through any suitable electronic arrangement. It is further possible to transform the alternating modification in temperature of the filament 1 into alternating current through the agency of a photocell or of a thermocouple controlling an electronic amplifier for the alternating component of the photoelectric or thermoelectric current.

As concerns the arrangement for the alternating distribution of the gases over the filament 1, numerous means may be imagined for producing said distribution without unduly widening the scope of my invention as defined in the accompanying claims. For instance, as illustrated in Fig. 2, the alternating flow of gases over the filament may be ensured by an auxiliary platinum filament 13, the current feeding which is periodically switched off by a cam 14 playing the same part as the cam 3 in Fig. 1. This embodiment shows the advantage of simplifying the mechanical section by cutting out the elastic diaphragm or the piston substituted for the latter.

Obviously it is also possible, without unduly widening the scope of my invention as defined in the accompanying claims, to make the gas to be analyzed pass over the catalytically active platinum filament in alternation with a gas which does not contain any combustible component and fed from a provision of gas under pressure, having a sufficient capacity.

Turning now to Figs. 5, 6, 7 and 8, illustrating the details of an apparatus for measuring the contents of methane or of acetone in air, the electric circuit is illustrated in Fig. 5. A potentiometric recorder is connected across the terminals E and F and may operate on a number of sensitivities: 1–2.5–5–10–25 millivolts. The two condensers 8 and 9, the capacity of each of which is 6,000 microfarads, are of an electrolytic type. The resistance 7 has an approximate value of 0.4 ohm; the primary or secondary cells are connected across A and D.

Figure 6:
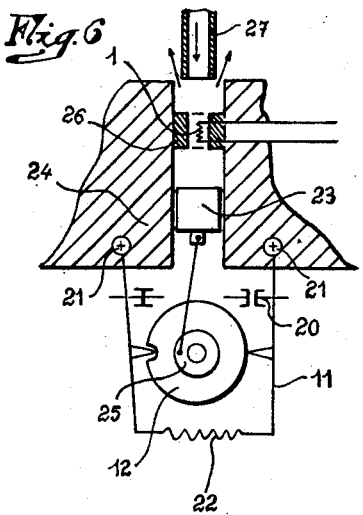
Fig. 6 shows the detail of the contact-pieces of the distributing system.

Fig. 6 illustrates the arrangement of the contact-pieces of the distributor 11. These contact-pieces 20, made of platinum, are mounted on axes 21 and are held in position by the spring 22 inserted between them. The movement of the gases in alternating directions is produced by the piston 23 moving inside the pump body 24 under the action of a connecting rod system 25 which is substituted for the cam 3 shown in the diagrammatic embodiment of Fig. 1.

The body of the pump is capped by a combustion chamber 26 inside which is housed the filament 1. The pump body 24 should provide a clearance as small as possible when the piston is in its upper idle position, so as to reduce the time constant of the measuring apparatus. The gas to be analyzed, which is fed through a channel 27, flows continuously in the direction of the arrows over the combustion chamber 26.

The arrangement including the path followed by the gases to be analyzed, the combustion chamber and the pump body is illustrated with further detail in Figs. 7 and 8.

In this preferred embodiment, the arrangement forms a self-contained unit and is designed so as to be readily removable and consequently to be easily replaced when the incandescent filament 1 is no longer fit for service. To this end, the arrangement includes two securing jacks or pins 28. On the other hand and according to this embodiment, the filament itself may be readily replaced separately. For this purpose, it is fitted on an insulating plug 29 (Figs. 9 and 10) enclosing feed electrodes 30, said plug being removably inserted in a housing extending through the wall of the combustion chamber 26.

Inspection of Figs. 7 to 10 shows also that, in accordance with this preferred embodiment, the incandescent filament lies outside the stream of gases so that it cannot be reached by the combustion gases except through the combination of natural convection and gasiform diffusion. To this end, the gasiform stream enters the combustion chamber 26 and passes out of it through a series of peripheral ports 31.

I wish now to define the two main advantages of my novel and improved apparatus adapted to measure the contents of a combustible component in a gasiform mixture as compared with prior arrangements. These advantages are:

The shifting of the zero, as a consequence of the physical transformation of the catalyst, is cut out.

The replacement of the platinum filament when destroyed requires no bridge balancing or the like adjustment and may easily be executed in situ by changing the self-containing unit shown in Fig. 7, which is an easy matter.

The execution of my improved method and means is thus particularly favorable for the establishment of continuously measuring instruments to be associated with recording or alarm devices in particularly dangerous premises such as coal mines, sources of natural gases and various plants. A measuring and recording potentiometric arrangement associated possibly with an electronic amplifier may allow for instance the continuous control and measuring of the air rising out of a mine shaft. Or else, a photo-cell located at a suitable point of the path of the luminous spot of a galvanometer may release an alarm system for critical predetermined contents of combustible gases.

As to the speed of rotation of the cam or of the connecting rod system, i.e. the frequency of reversal of the stream of gases sweeping over the filament, it is defined on the one hand by the speed of cooling of the filament bathed by the stream of combustible gases and on the other hand by the throughput required for obtaining, according to the case, a substantially complete or only partial combustion.

Thus for instance in the case of the embodiment illustrated in Figs. 5 to 10 in which case the combustion is only partial, the constructional features may be advantageously as follows:

- A filament of rhodium-containing platinum containing 10% of rhodium.
- Cross-section of the filament: 0.12 mm.
- Filament coiled to form 16 convolutions round a core of a diameter of 0.3 mm.

Speed of rotation of the rotary member 25 controlling the connecting rod system: 33 r.p.m.

Lastly, it is obvious as already stated that my invention is by no means limited to the sole embodiments of a measuring instrument, nor to the sole application and structural details disclosed hereinabove and it covers in contradistinction all the modifications thereof falling within the scope of the accompanying claims.

For instance, the platinum filament fitted in the opening of a chamber through which opening the gases are alternatingly sucked into and urged out of said chamber may be advantageously of a small thermal capacity, said suction and delivery of the gases being controlled as mentioned, for instance by a reciprocating pump or by the alternating expansion and contraction of the gases which are subjected intermittently to combustion inside the chamber. In all cases, the alternating modifications in the temperature of the catalyst should be translated into a physical or more precisely into an electrical magnitude so as to allow an easy and continuous reading of indications in values of the desired contents.

It may also be of advantage in many cases to deflect a fraction of the gasiform mixture out of the main stream to make it act intermittently on the catalytic mass.

What I claim is:

1. An apparatus for the differential measuring of the contents of the combustible component of a gasiform mixture comprising a catalytic variable resistance adapted to inflame said combustible component when hot, means sweeping alternatingly over said resistance batches of said gasiform mixture and of a reference non-combustible gasiform mixture, a circuit system inside which said resistance is inserted, said system including two parallel elements, an automatic control system adapted to insert alternatingly at a rapid rhythm each of said parallel elements in the resistance circuit and to simultaneously control the means sweeping in alternation batches of said gasiform mixture and of the reference mixture over said catalytic variable resistance, said control system operating at a predetermined high rhythm to make the sweeping of each mixture register in time with the insertion of the corresponding element in the circuit and a measuring instrument fed by the pulses of variably different intensities passing through the resistance brought to correspondingly variably different temperatures by the reference mixture and by the first gasiform mixture upon combustion and through the corresponding parallel elements alternatingly.

2. An apparatus for the differential measuring of the contents of the combustible component of a gasiform mixture comprising a catalytic variable resistance adapted to inflame said combustible component when hot, means sweeping alternatingly over said resistance batches of said gasiform mixture and of a reference non-combustible gasiform mixture produced by the combustion of said first-mentioned gasiform mixture, a circuit system inside which said resistance is inserted, said circuit system including two parallel elements, an automatic control system adapted to insert alternatingly and at a rapid rhythm each of said parallel elements in the resistance circuit and to simultaneously control the means sweeping in alternation batches of the first gasiform mixture and of the reference mixture over said catalytic variable resistance, said control system operating at a predetermined high rhythm to make the sweeping of each mixture register in time with the insertion of the corresponding element in the circuit and a measuring instrument fed by the pulses of variably different intensities passing through the resistance brought to correspondingly variably different temperatures by the reference mixture and by the first gasiform mixture upon combustion and through the corresponding parallel elements alternatingly.

3. An apparatus for the differential measuring of the contents of the combustible component of a gasiform mixture comprising a catalytic variable resistance adapted to inflame said combustible component when hot, means sweeping alternatingly over said resistance, batches of said gasiform mixture and of a reference non-combustible gasiform mixture, a circuit system inside which said resistance is inserted, said circuit system including two parallel elements, a condenser inserted in each of said elements, an automatic control system adapted to insert alternatingly and at a rapid rhythm each of said parallel elements in the resistance circuit and to simultaneously control the means sweeping in alternation batches of the first gasiform mixture and of the reference mixture over said catalytic variable resistance, said control system operating at a predetermined high rhythm to make the sweeping of each mixture register in time with the insertion of the corresponding element in the circuit and a measuring instrument fed by the pulses of variably different intensities passing through the resistance brought to correspondingly variably different temperatures by the reference mixture and by the first mixture upon combustion and through the corresponding parallel elements alternatingly.

4. An apparatus for the differential measuring of the contents of the combustible component of a gasiform mixture comprising a catalytic variable resistance adapted to inflame said combustible component when hot, a combustion chamber enclosing the resistance, means sweeping alternatingly into said chamber over the resistance batches of said gasiform mixture and of a reference non-combustible gasiform mixture, a circuit system inside which said resistance is inserted, said circuit system including two parallel elements, an automatic control system adapted to insert alternatingly and at a rapid rhythm each of said parallel elements in the resistance circuit and to simultaneously control the means sweeping in alternation batches of said gasiform mixture and of the reference mixture over said catalytic variable resistance, said control system operating at a predetermined high rhythm to make the sweeping of each mixture register in time with the insertion of the corresponding element in the circuit and a measuring instrument fed by the pulses of variably different intensities passing through the resistance brought to correspondingly variably different temperatures by combustion of the first mixture and by the reference cooling mixture and through the corresponding parallel elements alternatingly.

5. An apparatus for the differential measuring of the contents of the combustible component of a gasiform mixture comprising a catalytic variable resistance adapted to inflame said combustible component when hot, a combustion chamber enclosing the resistance and the wall of which includes a diaphragm, said diaphragm being adapted to sweep alternatingly into said chamber over the resistance batches of said gasiform mixture and of a reference non-combustible gasiform mixture, a circuit system inside which said resistance is inserted, said circuit system including two parallel elements, an automatic control system adapted to insert alternatingly and at a rapid rhythm each of said parallel elements in the resistance circuit and to simultaneously control said diaphragm sweeping in alternation batches of said gasiform mixture and of the reference mixture over said catalytic variable resistance, said control system operating at a predetermined high rhythm to make the sweeping of each mixture register in time with the insertion of the corresponding element in the circuit and a measuring instrument fed by the pulses of variably different intensities passing through the resistance brought to correspondingly variably different temperatures by the first gasiform mixture upon combustion and by the reference mixture and through the corresponding parallel elements alternatingly.

6. An apparatus for the differential measuring of the contents of the combustible component of a gasiform mixture comprising a catalytic variable resistance adapted to inflame said combustible component when hot, a combustion chamber enclosing said resistance and the wall of which includes a shiftable piston, said piston being adapted to sweep alternatingly over said resistance batches of said gasiform mixture and of a reference non-combustible gasiform mixture, a circuit system inside which said resistance in inserted, said circuit system including two parallel elements, an automatic control system adapted to insert alternatingly and at a rapid rhythm each of said parallel elements in the resistance circuit and to simultaneously control said piston sweeping in alternation batches of said gasiform mixture and of the reference mixture over said catalytic resistance, said control system operating at a predetermined high rhythm to make the sweeping of each mixture register in time with the insertion of the corresponding element in the circuit and a measuring instrument fed by the pulses of variably different intensities passing through the resistance brought to correspondingly variably different temperatures by the first gasiform mixture upon combustion and by the reference mixture and through the corresponding parallel elements alternatingly.

7. An apparatus for the differential measuring of the contents of the combustible component of a gasiform mixture comprising a catalytic variable resistance adapted to inflame said combustible component when hot, a combustion chamber enclosing the resistance, means sweeping alternatingly into said chamber over the resistance batches of said gasiform mixture and of a reference non-combustible gasiform mixture, produced by the combustion of said first-mentioned gasiform mixture, a circuit system inside which said resistance is inserted, said circuit system including two parallel elements, an automatic control system adapted to insert alternatingly and at a rapid rhythm each of said parallel elements in the resistance circuit and to simultaneously control the means sweeping alternatingly batches of the first gasiform mixture and of the reference mixture over said catalytic variable resistance, said control system operating at a predetermined high rhythm to make the sweeping of each mixture register in time with the insertion of the corresponding element in the circuit and a measuring instrument fed by the pulses of variably different intensities passing through the resistance brought to correspondingly variably different temperatures by the reference mixture and by the first gasiform mixture upon combustion and through the corresponding parallel elements alternatingly.

References Cited in the file of this patent

UNITED STATES PATENTS

| | | |
|---|---|---|
| 2,010,995 | Jacobson | Aug. 13, 1935 |
| 2,302,061 | Schirm | Nov. 17, 1942 |
| 2,363,478 | Boeke | Nov. 28, 1944 |
| 2,579,352 | White | Dec. 18, 1951 |
| 2,702,471 | Vonnegut | Feb. 22, 1955 |

FOREIGN PATENTS

| | | |
|---|---|---|
| 342,995 | Great Britain | Feb. 12, 1931 |